United States Patent [19]

Rademacher

[11] Patent Number: 4,787,572

[45] Date of Patent: Nov. 29, 1988

[54] MULTI-SIZE TAPE CASSETTE WINDING APPARATUS

[75] Inventor: Karl-Heinz Rademacher, Alsbach, Fed. Rep. of Germany

[73] Assignee: Robert Bosch GmbH, Stuttgart, Fed. Rep. of Germany

[21] Appl. No.: 79,832

[22] Filed: Jul. 30, 1987

[30] Foreign Application Priority Data

Aug. 8, 1986 [DE] Fed. Rep. of Germany ....... 3626942

[51] Int. Cl.[4] .................. G11B 25/06; G11B 15/675; F16H 27/02
[52] U.S. Cl. .................................. 242/201; 360/94; 74/89.15; 74/665 GD
[58] Field of Search .............. 384/9, 26, 29; 33/1 M; 108/143; 74/471 XY, 27, 89, 89.13, 89.14, 89.15, 665 GD; 242/179, 197–203; 360/93, 94

[56] References Cited

U.S. PATENT DOCUMENTS

| | | | |
|---|---|---|---|
| 2,941,136 | 6/1960 | Marantette et al. | 318/176 |
| 4,379,313 | 4/1983 | Tsuchiya et al. | 360/96.5 |
| 4,636,887 | 1/1987 | Kato et al. | 360/85 |

FOREIGN PATENT DOCUMENTS

133822 3/1985 European Pat. Off.

*Primary Examiner*—David Werner
*Attorney, Agent, or Firm*—Frishauf, Holtz, Goodman & Woodward

[57] ABSTRACT

To provide for conjoint movement of reel tables (1,2) on which the centers of winding reels of cassettes having different reel spacing, for example from a set of cassettes, can be positioned, the reel tables are located on respective carriages (5,25) operable in a common plane along guide reels or rods (3,4; 23,24), and commonly driven from a single motor (13). The motor 13 is in engagement, via bevel gears coupled to the shaft, with two spindles (7,27), engaged by spindle nuts which are coupled to the respective carriages, so that, upon rotation of the motor, both of the reel tables will move in a common plane and will shift proportionately along the guide tracks or rods, thereby moving conjointly, and proportionately with respect to said axis of symmetry.

3 Claims, 1 Drawing Sheet

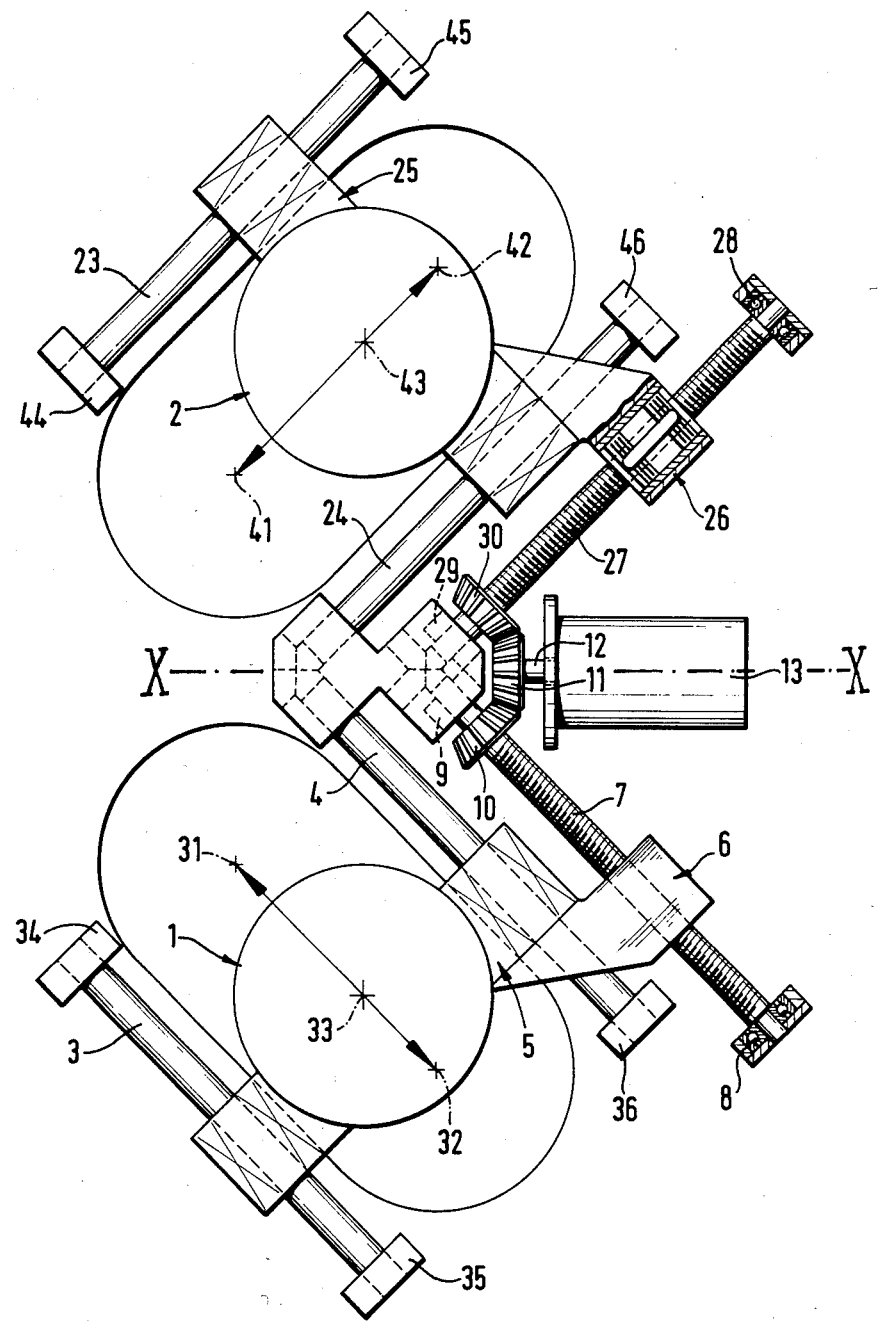

MULTI-SIZE TAPE CASSETTE WINDING APPARATUS

Reference to related patents, the disclosures of which is hereby incorporated by reference:

U.S. Pat. No. 4,379,313, Tsuchiya;
U.S. Pat. No. 4,636,887, Kato et al

Reference to related publication:

European Patent application publication number 0 133 822, Shiratori

Reference to related applications, assigned to the assignee of the present application, the disclosure of which is hereby incorporated by reference:

U.S. Ser. No. 079,829, filed July 30, 1987, Rademacher;
U.S. Ser. No. 079,820, filed July 30, 1987, Rademacher and Wolf;
and U.S. Ser. No. 079,819, filed July 30, 1987, Rademacher.

The present invention relates to magnetic tape transducing apparatus, and more particularly to magnetic tape winding apparatus, especially for digitally recorded video tape, in which tapes can be retained in cassettes of different sizes and tape storage capability.

BACKGROUND

It has been proposed to provide tape for digitally encoded television signals in cassettes of different dimensions; the widths dimension of the tape is governed by the recording apparatus and will stay the same. The plan dimension of the cassettes, however, will change in accordance with the storage capacity of reels in the cassettes. While the width is standardized, three plan dimensions for respectively small or S, medium or M, and large or L reels and hence cassettes have been proposed. For example, sizes, in plan view, of the cassettes which would meet these requirements have been suggested of 172×109 mm for a S-cassette, 254×150 mm for the M-cassette and 366×206 mm for the L-cassettes.

Smallest size of the cassettes can be obtained by placing the respective cassette reels as close to each other as possible. This means that a tape cassette having only a short tape length wound thereon can be constructed such that the axes of rotation of the tape reels are closer to each other than in a cassette of medium, or large tape reserve. For universal applicability of a transducer apparatus, however, it is desirable that the transducer apparatus can operate with any cassette of the set, in which the set is defined by the width of the tape being standard, and the dimensions of the S, M and L-cassettes, or other cassettes being variable. Such sets are particularly suitable for digital TV recording in studios, to permit programs of respectively different lengths to be recorded and reproduced from their own tapes in their own cassettes.

The magnetic tape transport function requires that the respective tape reels are either driven, or braked, or retarded, in accordance with a predetermined transport direction and transport conditions. For defined engagement with the magnetic tape reels in the cassettes, a fixed connection between the reel drive shafts, or drive connections and the reels themselves is necessary. Thus, if the various cassettes of a set have different spacing of the reels from each other, it is necessary that the shafts of the dynamo electric apparatus, such as winding motors, or dynamic brakes, can be placed at different spacing from each other, to match the spacing of the reels in the respectively different cassettes.

Eurpopean patent disclosure document 0 133 822 Shiratori describes a magnetic tape apparatus for recording or reproduction of recorded contents which permits matching of different axial spacing of the tape reels of cassettes by providing a pair of movable reel tables, for example for engagement with the cassette reels. The reel tables are directly supported on shafts of the dynamo electric apparatus, which are movable in a common plane on guide tracks, in mirror image with respect to each other. The guide tracks are angled with respect to each other by 90°. Upon simultaneous shift of the motors, including the reel tables, the axial spacing of the reel tables will change in the desired manner. The drive of the shift arrangement is obtained by crank and worm gear couplings, together with a directing linkage, coupled to the worm gear couplings. The cranks are operated in respectively opposite direction. Linear relationship between the angular paths of the worms and reel tables via the worm gears is not, however, obtained and the linear path of the shift and the reel tables and reels coupled thereto cannot be reliably maintained. Only at the end positions of the cranks are definite relationships between the cranks and the shifting mechanism, typically a carriage or the like possible, that is, the absolute position of the shafts rotating the respective reels on the shift plane.

THE INVENTION

It is an object to improve a winding apparatus for magnetic tape spooling cassettes, in which the cassettes are available in sets of respectively different axial spacing of two reels in a cassette, which is reliable, and provides for positioning at predetermined location, of engagement shafts or reel tables with the respective reels in the cassettes, so that any cassette of a set can be reliably wound, or unwound, under controlled conditions, by the respective winding motors.

Briefly, a coupling arrangement is provided which couples a drive for both of the reel tables to move the reel tables, and hence the reel shafts in a common plane, which drive is characterized by consisting of linearly proportionally acting elements; the linearly proportionally acting elements may, for example, include two worm drives parallel to the displacement or shift paths of the reels and being driven from a common drive motor, so that, upon rotation of the motor, slider or carriages coupled to the worms and operating in a common plane, to which the reel tables and/or the reel drive motors are attached will move together, that is, towards each other or away from each other by linearly proportional, preferably equal movement.

The tape winding apparatus has the advantage that magnetic tape cassettes of different dimensions, for example belonging to a set, can be placed on the apparatus while retaining the linear relationship between the operating path of the drive and the shift path of the operating shafts for the tape reels, independently of the particular position of the tape reels on the shift path. Thus, at extreme end positions, for example, large or small, respectively, cassettes can be accommodated and at an intermediate position, which can be determined by a stop or other suitable sensing element, a medium size cassette can be accommodated. The angle of rotation - which may include many revolutions of a drive motor - can be sensed and, upon suitable evaluation thereof, carriages or sliders can be precisely positioned to accept the respective cassettes of the respective sizes.

DRAWINGS

The single FIGURE is a schematic top plan view of the winding apparatus.

DETAILED DESCRIPTION

Two reel tables 1,2 are movable in a common plane. The reel tables 1,2 may have respectively different positions, in dependence on the respective cassette with which they are to cooperate, that is, the reel spacing of the cassettes to be placed on the apparatus. The operating motors must be shifted in a plane parallel to the plane of the reel tables. The guide tracks, or guide paths for the reel tables 1,2 are located at an angle of 90° with respect to each other. Upon similar shift of the spacing of the axes of the reel tables will result.

The guide arrangement for the reel tables 1,2 are identical in principle. Only one guide arrangement will be described in detail. The reel table 1 has a guide track system including two guide rods 3,4, located parallel to each other and retained, for example, on a frame on a tape recording apparatus, not further shown. A carriage 5 is slideable located on the guide rods 3,4. A follower arm is securely connected to the carriage 5. The follower arm 6 retains a threaded nut therein, which is maintained in axial position to permit slide shifting, by being located between disk springs, positioned at either end. The nut cannot rotate with respect to the arm 6. The inner threads of the nut 6 form a counter element to the outer thread of a spindle 7. Spindle 7 functions as a transport spindle; it is journalled between two bearings 8,9 and securely coupled to a bevel gear 10. Bevel gear 10 meshes with a further bevel gear 11 located on the shaft 12 of a drive motor 13. The thread on spindle 7, just as the inside thread on the nut within the arm 6, preferably, are Acme, or trapezoidal threads.

The drive motor 13 is located on an axis of symmetry X—X, which bisects the angular arrangement of the different centers of rotation of the sets of cassettes with which the apparatus is to cooperate. The bevel gear 11 driven by the motor 13 drives a further bevel gear 30 which is securely coupled to a second threaded spindle 27, which is likewise retained in two bearings 28,29. The spindle 27 is surrounded, in part, by a threaded nut located in the extension arm 26 of a second carriage or slider 25. The second reel table 2 is secured to the second slider 25. The slider 25 can shift on two guide bolts 23,24. Preferably, the gear transmission conditions of the respective bevel gear system 11-10 and 11-30 are selected to be equal. Further, the pitch of the two spindles 7 and 27, preferably, are equal. This ensures uniform movement of the two reel tables 1,2, and, if desired, of any motors or other dynamo electric apparatus coupled thereon upon rotation of the drive shaft 12 due to the motor 13.

Each one of the reel tables 1,2 can travel between two terminal positions, shown in the drawings by the terminal positions of the centers of the reel table at 31,41 and 32,42, respectively. To receive a cassette of smallest dimension, namely the S-cassette, the drive motor 13 is energized to operate in the direction which moves the threaded nuts including the arms 6,26 on the respective guide rods 5,25 until a mechanical stop 34,44 is engaged. A micro-switch, or other switching element can be used to sense this engagement, and deenergize motor 13, thus indicating that the reel tables have reached their innermost limiting position. The spacing between the axes of rotation of the two reel tables 1,2 will then correspond to the minimum spacing of the reels in the S-cassette.

To place a M-cassette, or a L-cassette on the apparatus, drive motor 13 is energized to rotate in counter-direction, to move the reel tables 1,2 towards the second terminal position, shown by the center designations 32,42 on the FIGURE. This, then, will correspond to the maximum spacing of the axes of rotation of the tape reels in the cassette, for example of a L-cassette. The carriages 5,25 engage against terminal stops 35,36, 45,46, respectively formed on the guide rods 3,4 and 23,24. Again, suitable limit switches can be used to deenergize the motor.

To provide an intermediate position of the reel tables 1,2, for example at positions 33,43 for a M-cassette, mechanical stops are undesirable and, in view of the aforementioned linear relationship between the rotation of the shafts 12 of the drive motor 13 and the linear shift path of the respective reel tables 1,2, it is a simple matter to count the angle over which the rotor of the drive motor 13 rotates, or the revolutions, that is, the overall angle of rotation of either one of the spindles 7,27. The instantaneous position of the respective reel tables 1,2 can thus be readily determined and a center position shown at 33,43 can be reproducibly commanded. Counting full, and partial revolutions of a shaft, and then controlling the motor in accordance with predetermined count number is well known and any suitable arrangement can be used.

In accordance with an alternative possibility, the position of the reel tables 1,2 corresponding to the intermediate position 33 can be determined by a light gate, by magnetic means or similarly; if a light gate is used, a projecting tab is secured to one of the carriages 5,25. Two light sources, located at a position corresponding to the positions 33,34 are secured to a frame, positioned adjacent each other. The carriage 5,25 carries a stop, or projection which blocks off light from the light sources to suitable detectors. If both light sources are covered, the appropriate position of the reel table has been determined. Various other contacting and non-contacting arrangements may be used to provide for unambiguous positioning of the reel tables 1,2 at selected locations along the shifting paths, as controlled by rotation of the motor 13.

Various changes and modifications may be made within the scope of the inventive concept.

I claim:

1. Magnetic tape winding apparatus for combination with any one of a set of magnetic tape cassettes
    in which the winding centers of tapes within the cassettes of the sets differ from each other,
    said apparatus having two reel tables (1, 2) located in a common plane;
    the centers of the reel tables being movable in a plane parallel to said common plane; and
    wherein said reel tables are movable in converging angled paths symmetrical with respect to an axis of symmetry (X—X) between the angled converging paths; and
    motor drive means (13) are provided to position the reel tables (1, 2) in accordance with the position of the winding centers of a specific cassette of the set, comprising, in accordance with the invention,
    coupling means (7, 10, 11, 12, 27, 30) coupling the drive means to both of said reel tables for moving the reel tables in said common plane, said coupling means being characterized by comprising coupling elements displaceable respectively in linear paths extending in the same directions as said converging angled paths by a distance which, with respect to rotation of said drive means has a linear distance vs. angle-of-rotation relationship.

2. The apparatus of claim 1 wherein the motor drive means comprises a common drive motor (13) and common drive coupling means (10, 11, 30) coupled to said drive motor and conjointly rotating said spindles (7, 27);

said coupling means comprise a pair of threaded spindles (7, 27), and coupling nuts (6, 26) surrounding said spindle and restrained from rotation therewith, to convert rotary movement of the spindles to linear movement;

guide means (3, 4) are provided, located in a plane parallel to said common plane;

and carriage means (5, 25) are provided, located on said guide means and linearly moved upon rotation of the spindles, the respective reel tables being coupled to and moved by the respective carriages.

3. The apparatus of claim 2 wherein the guide means comprise guide track elements (3,4; 23,24), said carriages being slideably located on said guide track elements;

wherein the reel tables (1,2) are located, respectively, on the respective carriages;

and wherein said guide tracks or reels for the respective carriages are positioned symmetrically with respect to said axis of symmetry (X—X)

* * * * *